May 15, 1951 — A. CLAUD-MANTLE — 2,552,885

DRAFT MEMBER AND COUPLING MEANS

Filed Oct. 31, 1947 — 3 Sheets-Sheet 1

Inventor
Arthur Claud-Mantle
By Rockwell & Bartholow
Attorneys

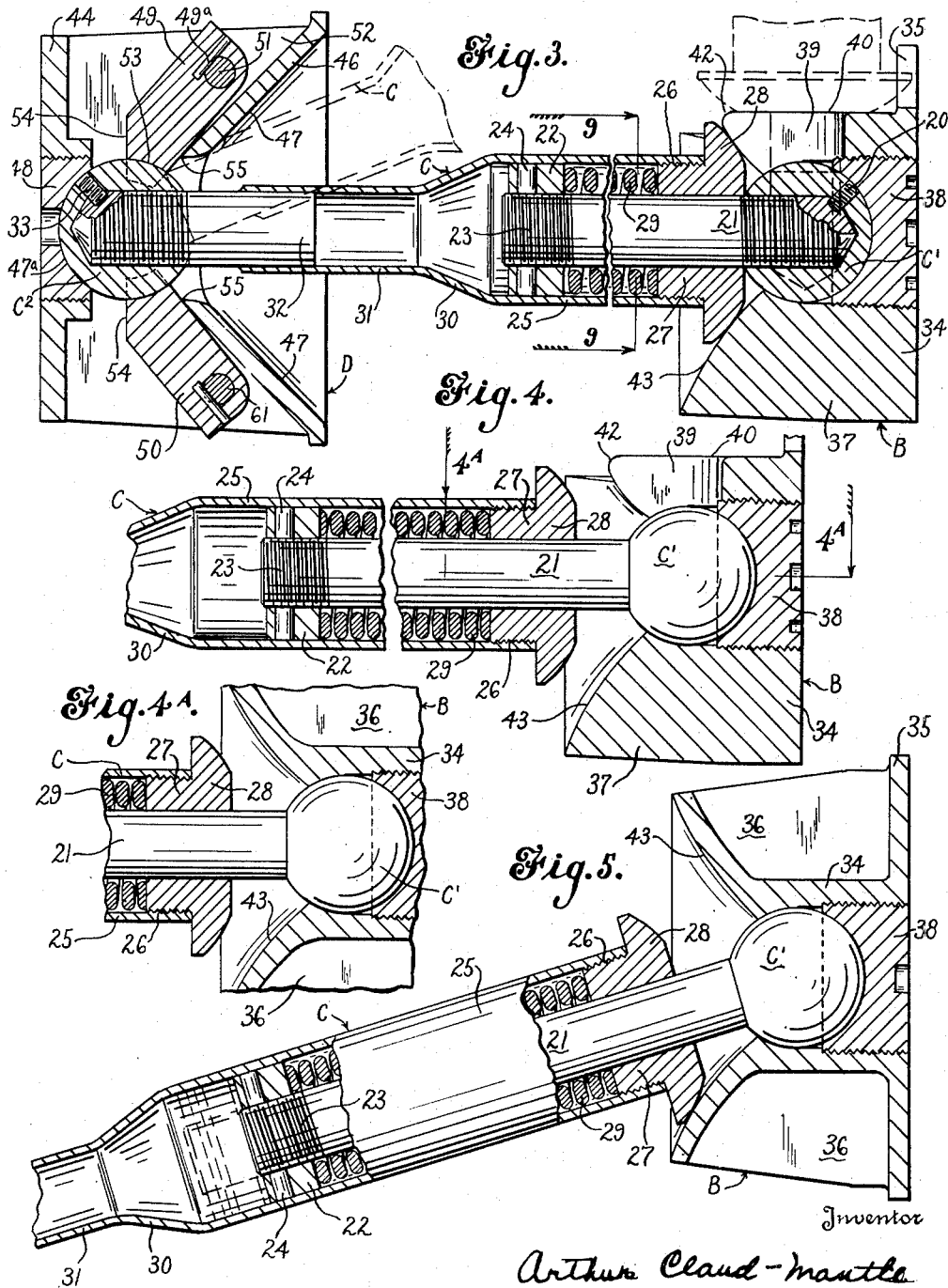

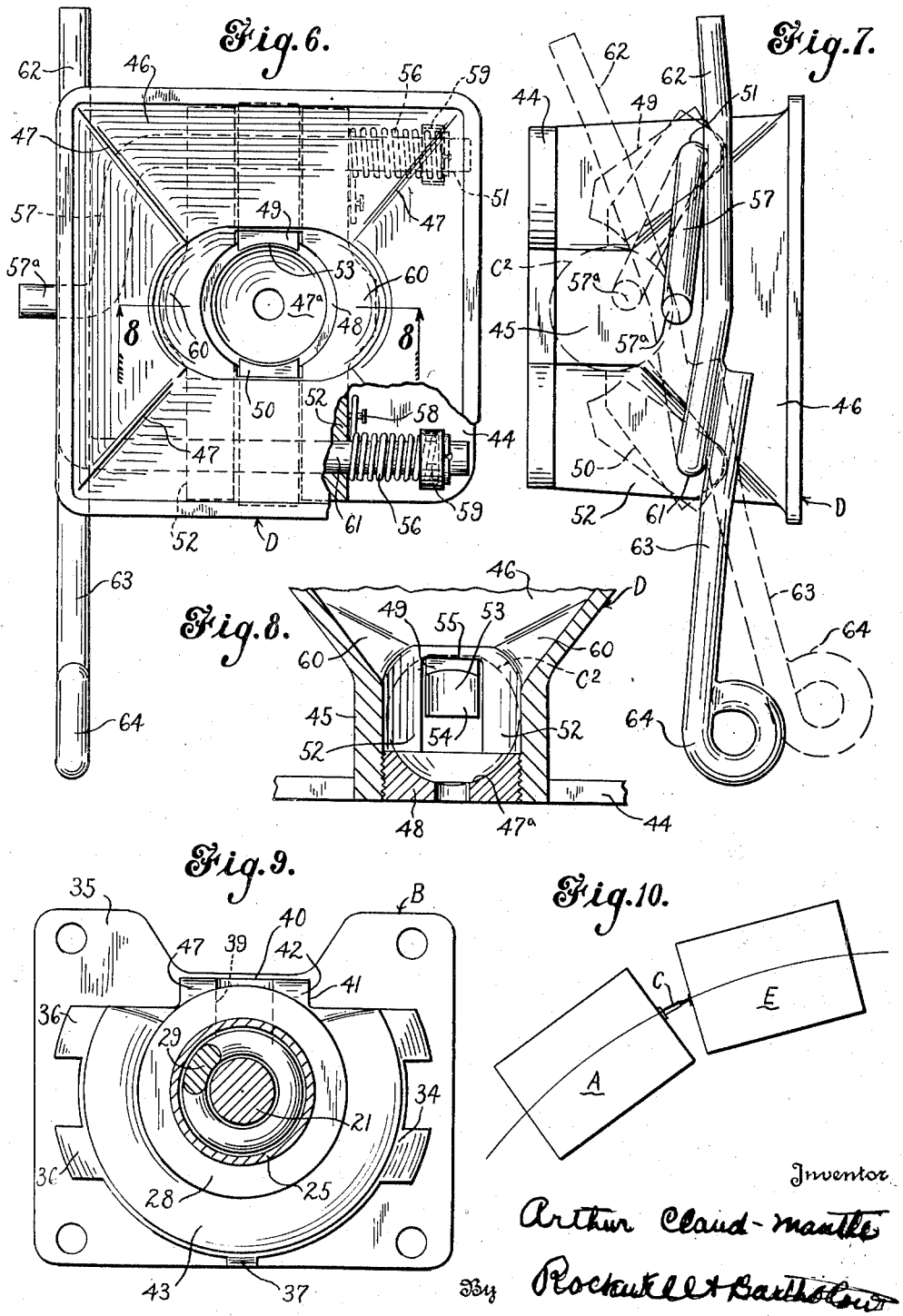

Patented May 15, 1951

2,552,885

UNITED STATES PATENT OFFICE 2,552,885

DRAFT MEMBER AND COUPLING MEANS

Arthur Claud-Mantle, Trumbull, Conn., assignor to The Bassick Company, Bridgeport, Conn., a corporation of Connecticut Application October 31, 1947, Serial No. 783,351

10 Claims. (Cl. 280—33.44)

This invention relates to couplers for road vehicles, and it has particular application to coupling arrangements for vehicles such as baggage trucks that are used at airports or railway stations, although it is not limited to this application.

A vehicle such as a baggage truck may be in the nature of a trailer coupled to and drawn by a power-driven vehicle. The device of the present invention may be used for such a purpose, or it may be used in a train of road vehicle units that are coupled together and drawn by a suitable hauling unit.

One of the objects of the present invention is to provide a coupler especially adapted for road vehicles, whereby the drawn vehicle is maintained under effective control by and from the drawing or leading vehicle, and is led or drawn in the desired path.

Another object is to provide an improved coupler which, when used for coupling together two vehicles, prevents inching or jack-knifing and, when the vehicles are on a curve and the leading one is stopped or slowed down, acts as a brake on the rear vehicle so as to maintain it in proper position and prevent jack-knifing.

Another object is to provide a coupling device by means of which the operations of coupling and uncoupling can be carried out very easily.

To these and other ends the invention consists in the novel features and combinations of parts to be hereinafter described and pointed out in the claims.

In the accompanying drawings:

Fig. 3 is a section on line 3—3 of Fig. 2, partly broken away, the parts being shown in a position in which the coupler is not under draft;

Fig. 4 shows certain parts illustrated in Fig. 3, the position illustrated being one taken in starting the drawing or pulling movement;

Fig. 4A is a detail section on line 4A—4A of Fig. 4;

Fig. 5 is a horizontal section with parts broken away, showing the tow bar in a position in which it has been swung laterally with respect to the leading vehicle;

Fig. 6 is a face view of the coupling member on the following vehicle, with parts broken away;

Fig. 7 is a side view of the member shown in Fig. 6;

Fig. 8 is a section on line 8—8 of Fig. 6;

Fig. 9 is a section on line 9—9 of Fig. 3; and

Fig. 10 is a diagram showing two intercoupled vehicles moving on a curve.

Figure 1:
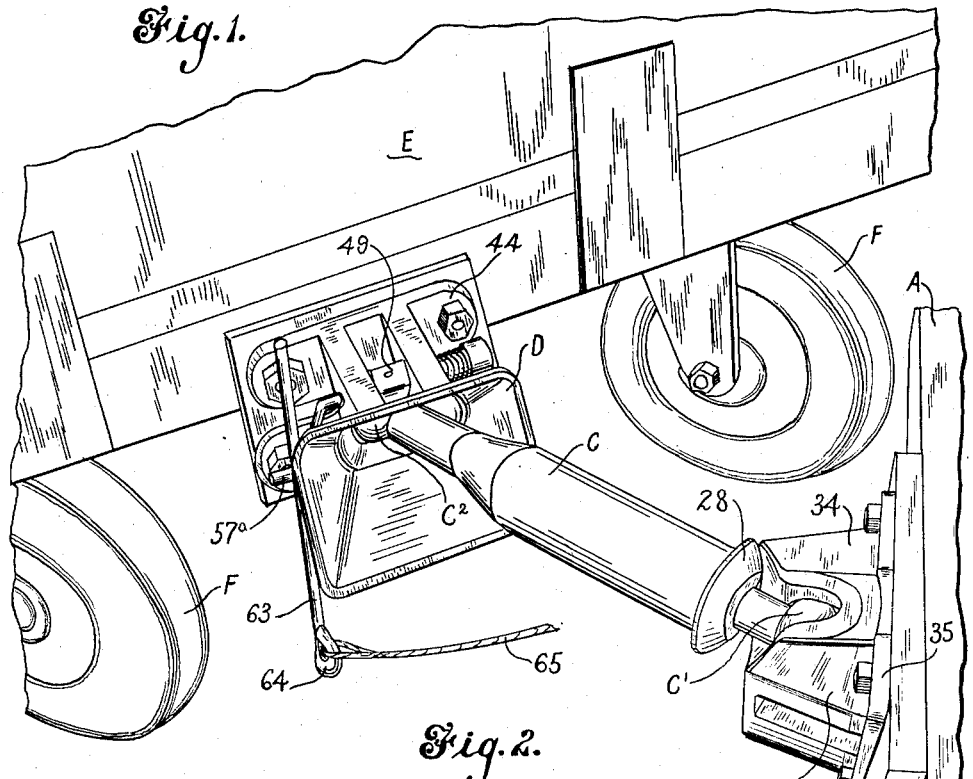
Fig. 1 is a fragmentary perspective view showing two vehicles coupled together by a coupler embodying the invention, the vehicles being shown in positions which they assume in rounding a curve.

In the device selected for illustration, the leading vehicle carries a coupling member in which is ball-socketed a tow bar that is permanently held in its socket when the device is in use, the tow bar extending rearwardly so as to be engageable with a female coupling member carried by the following vehicle, the tow bar being normally in a position in which it projects horizontally and perpendicularly rearwardly from its carrying vehicle, although the tow bar can, under a predetermined stress, be swung with reference to its carrying vehicle, as hereinafter described. At its rear end the tow bar carries a ball or spherical member adapted to be engaged with and to be held in the coupling member on the following vehicle, said coupling member being equipped with a ball socket permitting universal movement of the tow bar within certain limits, the socket of the rear coupling member being self-closing, so that, when the tow bar moves into the rear coupling member, the coupling will be effected. The locking engagement of the rear coupling member with the tow bar can, however, be released, when this is desired, through the actuation of locking or holding jaws in a releasing direction. The locking or holding jaws are under the control of a master releasing element such as an actuating arm, the movement of which will cause the opening movement of the jaws whereby the rear vehicle is detached from the tow bar.

In the drawings, a part of the leading vehicle is indicated at A, the coupling member carried by this vehicle is indicated at B, the tow bar at C, and the female coupling member carried by the following vehicle at D. The member D is carried by the vehicle E, which in this case is provided with forward wheels F, which are parts of swivel casters. These casters permit the wheels to turn in any direction, whereby it is possible for the following vehicle to follow in the track of the leading vehicle. The ball or sphere carried by the forward end of the tow bar, and permanently socketed in member B, is indicated at C', and the ball or sphere socketed in member D is indicated at C².

The tow bar C is of composite structure involving two members that are longitudinally movable with reference to each other, there being provided within the bar a resilient member, illustrated as a spring, controlling this longitudinal movement. In the particular device shown, the construction is as follows:

The ball C' is threaded on and is locked by means of a fastening screw 20 to the forward end portion of a rod 21 in the nature of a piston rod carrying adjacent the opposite end a piston or disk 22. The piston has a hole with interior screw threads engaging screw threads 23 provided upon the rod, the piston being locked on the rod by means such as a pin 24. The periphery of the piston is engaged by the inner surface of a round elongated metal shell 25. The piston rod and the shell 25 provide two members which are relatively movable longitudinally, the piston rod carrying the ball C' and the shell carrying the ball C² through the means hereinafter mentioned. The shell 25 has an open forward end which is interiorly threaded, as indicated at 26, to receive an exteriorly threaded round head 27 provided with a lateral flange 28. This flange 28 has a curved forward surface to engage surfaces on the member B, as hereinafter described. Located within the shell 25, in the space between the piston 22 and the head 27, is a relatively heavy helical spring 29. This spring is under compression and has a tendency to separate members 21 and 25, thrusting member 25 forwardly and member 21 rearwardly, the normal positions of the latter parts being as shown in Fig. 3. Referring to this view, it will be noted that rearwardly of the piston the wall of the shell is reduced in diameter by providing a sloping stop portion indicated at 30. Rearwardly of the portion 30 the wall of the shell is cylindrical, as shown at 31. The portion 31 is suitably connected, as by welding, to a rod-like part 32 which extends into the ball C² and is suitably threaded thereto and also locked by a screw 33.

The coupling member B is permanently connected to the tow bar by having the ball C' permanently engaged in a partly spherical socket in the member B. The tow bar can swing in all directions relatively to member B, but this is normally prevented by the strong pressure exerted by flange 28 against the forward face of the coupling member under the influence of the spring 29, and the bar can be swung only after the holding effect of the spring has been overcome.

The member B comprises a block 34 having at the forward end an integral attaching flange 35 whereby the member can be bolted or otherwise attached to its carrying vehicle. The block is strengthened by two lateral webs 36 at each side and by a bottom web 37 which is vertical. The partly spherical socket receiving ball C' is formed in part on the block proper, and in part on a plug 38 screwed into a round hole in the forward part of the coupling member. Within the block proper the overhang is sufficient to prevent the movement of the ball in a rearward direction (Fig. 3), but in case of need the tow bar can be disconnected from the coupling member by removing the plug 38 and releasing the ball from the piston rod and then shifting the ball forwardly (Fig. 3).

Figure 2:
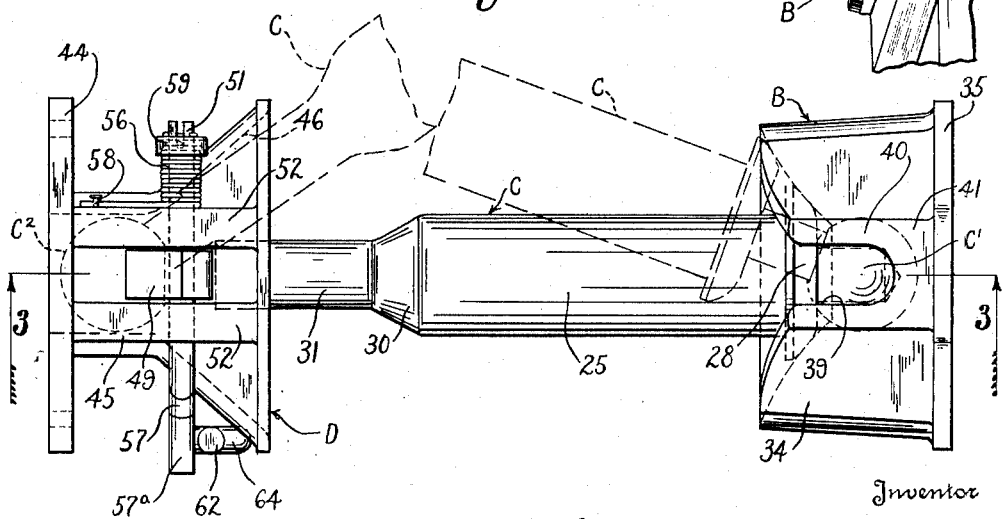
Fig. 2 is a top plan view of a device embodying the invention, removed from the vehicles, the coupling member carried by the forward vehicle being in line with that carried by the rear vehicle.

The upper part of the block 34 is cut away and provided with an open space 39 which permits the bar to be swung upwardly into the upright position shown in dotted lines in Fig. 3. Under such conditions the opening or recess 39 accommodates the rod 21, and the flange 28 engages a horizontal top surface 40 that extends along the sides and across the front end of the recess 39, as shown in Fig. 2. This top surface 40 is provided upon a flange-like part 41 that extends upwardly to a slight extent from the block 34. At the rear part this portion 41 is rounded, as shown at 42, so as to provide a surface along which the flange 28 will slide when the tow bar is moved from the horizontal position to the upright position. At its forward end the recess 39 is rounded in plan to conform to the curvature of the tow bar, and at its rear the recess merges into the dished recess on the rear face of the coupling member within which the flange 28 is engaged when the tow bar is in the horizontal position. The dished recess referred to is indicated at 43, and this is concentric with the ball socket and extends to a substantial degree above the center of said socket, as shown in Fig. 9, being in the form of a ring cut off at the upper part, but extending in this particular case through approximately 245° of a circle. In a place where the circle is cut away the recess 39 is provided, this recess in plan extending axially of the member B, and said recess being defined at its upper part between upstanding walls which support and receive pressure from the flange 28 when the bar is raised to the vertical position.

The surface of the dished recess 43 is in this particular case located generally at an angle of approximately 50° to the horizontal longitudinal axis of the coupling member. The surface of this recess is preferably slightly convex, as shown in Figs. 3 and 4, and the co-acting surface of the flange 28 is also preferably slightly convex. In the form shown, the tow bar can be swung to either side of the coupling member to an angle of approximately 35°, and it can be swung downwardly to a like extent. In an upward vertical direction it can be swung through substantially 90°, owing to the provisions described above.

The coupling member D has an integral attaching flange 44 at the rear by means of which it is secured on its vehicle by means such as attaching bolts. This member has a hollow body portion 45, and forwardly of the body portion a relatively large rectangular flaring mouth or funnel 46. In front elevation the mouth or funnel is square and it has inclined side walls forming corner portions which are provided interiorly with curved surfaces conforming more or less closely to the curvature of the ball on the tow bar and adapted to guide the ball toward the ball socket. The curved corner surfaces are indicated at 47. The ball C² is positioned partly by a partly spherical socket 47ª provided in the rear wall of the coupling member. In this particular case the rear wall has an interiorly threaded hole into which is screwed a plug 48, said plug being shaped to provide the socket 47ª. The ball is also positioned by the lateral walls of the coupler body and by swinging spring-pressed jaw members 49 and 50, respectively, mounted on the coupling member, the jaw member 49 being at the upper part and the member 50 being at the lower part. The swinging jaws are shaped to engage the ball forwardly of its vertical center plane so as to prevent it from being withdrawn from the socket 47ª. The jaw 49 is fixed by suitable means such as a pin 49ª to a journal rod 51 horizontally disposed in the coupling member behind the funnel and adapted to turn to a limited degree in its mounting. In the form shown the rod 51 is rockingly mounted in parallel flanges 52 which are vertically disposed and are integral with the coupling body, the jaw 49 being located in a space provided between these flanges. The jaw 49 is in part behind the upwardly and forwardly inclined wall of the funnel, but at its lower end portion projects downwardly beyond this wall in order to co-act with the ball. At its lower surface it is provided with a partly spherical surface 53 adapted to conform to the ball surface. Near the lower end the rear of the jaw is slabbed off at an angle, as shown at 54. In the operative position of the jaw the forward face of the latter, in a region intermediate the jaw ends, makes contact with the lower edge of the adjacent wall of the funnel, as indicated at 55, so that the funnel provides a stop for the jaw. A suitable spring normally holds the jaw in this position. In the present case a spring 56 is provided, the same encircling one end portion of the rod 51, which end portion is disposed at one side of the flanges 52. The other end of the rod is at the other side of said flanges, and is bent to provide a crank portion 57. The spring 56 is coiled about the rod and one end acts against a pin 58 provided upon the adjacent flange 52. The opposite end of the spring is engaged in a kerf provided in the extremity of the rod, and an adjacent portion of the spring coil is encased in a cap 59 that is held in place in a suitable manner, as by a cotter pin passing through the rod end. The cap 59 holds the end of the spring in the kerf.

It will be seen from Fig. 6 that the jaw 49 extends downwardly beyond the upper wall of the funnel to a certain degree, and that the lower jaw 50 projects upwardly beyond the lower wall of the funnel in a similar manner, thus providing a latching arrangement that will catch and hold the ball when the latter is forced through the open bottom portion of the funnel. This open bottom portion is provided adjacent the right and left margins (Fig. 6) with depressed curved surfaces 60 which aid in centering the ball and directing it toward the holding socket. These surfaces 60 are spaced laterally from the holding socket provided by the jaws and the rear, partly spherical, surface, as will be seen from Fig. 6.

The lower jaw 50 is mounted similarly to the upper jaw 49. The mounting includes a lower journal rod 61, said rod being acted upon by a spring 56 formed and arranged as previously described. The spring-pressed end of the rod 61 is located beneath and in line with the spring-pressed end of rod 51. The opposite end of the rod 61 is bent at a right angle to provide a bar or arm 62 that extends across the end of the crank 57, said bar being extended in an upward direction. The extremity of the crank 57 is about midway between the top and bottom of the funnel and at one side thereof, and the bar 62 intermediate of its ends is adapted to be brought into engagement with the crank for the purpose of swinging the jaw 49. The rod 61 is also provided with a downwardly extending actuating arm 63 provided with a terminal loop 64 to which a lanyard 65 can be connected. The arm 63 is made rigid in a suitable way with the bar 62 and rod 61, and this arm, adapted to be pulled by the lanyard, may be extended downwardly adjacent one corner of the funnel, although modification may be made in this and other respects.

The extremity of the crank 57 is indicated at 57ª, and this is normally slightly spaced from the bar 62. Upon a slight swinging movement of the bar 62, effected through pull of the lanyard, or hand or foot manipulation, which preliminary movement will start the movement of jaw 50, the extremity 57ª will be engaged and the rocking movement of the jaw 49 will be commenced. Upon further movement both of the jaws will be swung rearwardly to disengage the ball C². There is no resistance to this disengagement owing to the fact that the jaw extremities which conform to the ball forwardly of its center are swung rearwardly and laterally away from the co-acting ball surfaces. This permits easy disengagement, and when the jaws have been shifted to only a slight extent the ball and its tow bar are released. As will be apparent from Fig. 3, the curved holding surfaces of the jaws, when in the holding position, extend forwardly from the transverse vertical center plane of the ball through an angle of somewhat less than 45° to the vertical in the case illustrated.

In the case illustrated, the upper and lower walls of the funnel extend at angles of approximately 42° to a horizontal longitudinal plane, and the side walls of the funnel extend at angles of approximately 37° to a vertical plane. When the tow bar is swung upwardly or downwardly (Fig. 3) to a certain extent, the side of the tow bar portion 32 will come against the upper or lower inclined funnel wall, as the case may be, and the permitted up-or-down angle of the bar will be approximately 22½° to a horizontal plane. In its side or lateral swing the tow bar has greater clearance relatively to the funnel, and the permitted side swing of the tow bar is approximately 35° from a longitudinal vertical plane.

Coupling of the two vehicles together can be effected very readily by placing the tow bar in the horizontal position and backing the forward vehicle so that the tow bar will engage the funnel of the rear coupling member. The described shape of the funnel increases the connecting-up capacity of the coupler, owing to the fact that the tow bar will be caught and held if its rear end enters any one of the corner portions of the funnel, which corner portions are shaped to provide valleys leading toward the center. Quick release of the coupler can be effected through the provisions previously described. The tendency of the rear vehicle when being towed is to move rearwardly from the forward vehicle, and the releasing movement of the jaws is generally in the same direction, and thus there is no tendency to jam the release mechanism. It will be understood that, although the holding jaws are released through the movement of a single actuating member such as an arm, the jaws are independent of each other in engaging and holding the ball of the tow bar in its seat. Thus, if for some reason one of the jaws is momentarily displaced with respect to the ball, the other jaw can continue to act as a holding member holding the tow bar in its seat. Thus the effective holding of the rear vehicle by the tow bar is insured.

It is to be observed that the jaws 49 and 50 spaced forwardly from the spherical seat 47ª are maintained in positions in which they are rearwardly and inwardly inclined, the pivots or swinging axes of the jaws being located adjacent their forward ends and their ball-engaging surfaces being located adjacent their rear ends. The funnel surfaces 55, or equivalent stop means, are disposed forwardly of the jaws and located between the ends of the jaws, and when pull is exerted on the tow bar, the ball, which is engaged in the spherical end portions of the jaws, is wedged more tightly between the jaws, inasmuch as the spherical surfaces of the jaws tend to move toward the ball, and thus, as the pull on the tow bar increases, the gripping effect of the jaws upon the ball increases. On the other hand, the arrangement of the parts is such that the jaws are opened by the impingement of the ball thereon, which ball enters the opening in the funnel, and by engaging the inner extremities of the jaws forces them open to an extent (the rear portions of the jaws swinging outwardly and rearwardly), and at or about the time the ball is engaged with the seat 47ª the jaws, which are self-closing, re-close on the ball to take the position shown in Fig. 3, in which position the ball is firmly held as above described. The only manual operation necessary in connection with the jaws is the releasing operation, the other operations being automatic. The springs acting on the jaws press them forwardly so that normally they are in contact with their forwardly located stops.

In Fig. 3 the coupler is shown in a position such as assumed after coupling of the vehicles, there being no draft or pull. In this position the flange or collar 28 is firmly engaged with the dished coupler face. When the forward vehicle commences to pull, the first effect is to displace the two members of the tow bar, provided there is sufficient resistance, and the members of the tow bar may for an instant take a position such as shown, for example, in Fig. 4, with the flange 28 out of engagement with the coupler face. However, after the rear vehicle has begun to move, the flange carried by the shell will again engage the face of member B. The spring will be compressed in proportion to the amount of pull being exerted. In the case shown, a pull of about seven hundred pounds is required to displace one member of the tow bar relatively to the other, and a pull of about one thousand pounds is required to bring the spring turns into contact with each other. It will be understood, of course, that the resiliency of the take-up is of great advantage in overcoming a jerky operation of the coupler in starting, pulling and stopping.

A further very important advantage arises from the fact that the swinging movement of the tow bar with respect to its carrying member is resiliently resisted. The same spring which provides the resilient take-up also provides resilient resistance against movement of the tow bar away from its rearwardly perpendicular position, this being due to the engagement of what may be termed the shell member of the bar with the dished cam face of the carrying member. In the case shown, approximately a fifty-pound thrust laterally is required to displace the bar from the perpendicular position, and a thrust of about one hundred and twenty-five pounds is required to move the bar to an angle of 35° from the coupler axis. By permitting lateral swing of the tow bar relatively to its carrying member, but resisting side thrust in a resilient manner, as by a spring, in the manner described, the leading vehicle leads the trailing vehicle in a correct path. When the vehicles round a curve their relative positions are as shown in Fig. 10, the rear vehicle having its forward end firmly held so that its wheels follow those of the leading vehicle. In this manner inching and jack-knifing are prevented. Also by this effect of having the forward end of the rear vehicle held laterally and longitudinally in position with reference to the forward vehicle, there is an effective braking action upon the rear vehicle when the two vehicles or the train of vehicles are slowed down or stopped on a curve. This braking, moreover, is of a resilient character owing to the resilient support provided for the towing bar against lateral swing with respect to its carrier, i. e., the forward vehicle, and the braking action is, therefore, one which will overcome or considerably reduce shocks or jerks. In rounding a curve the rear end of the tow bar would be displaced too far (for correct leading of the following vehicle) if the bar were rigid with the leading vehicle, but this is compensated for by a resilient connection of the character described. Under such conditions the spring permits the bar to swing to the extent necessary for proper tracking or following, but on the other hand prevents too much lateral movement of the following vehicle.

The fact that the tow bar is movable to upright position on the towing vehicle is obviously advantageous, because this is a safe position for the tow bar when the coupler is not in use.

It will be seen that in the form described the coupler is characterized by the fact that the forward vehicle has universal connection with a laterally rigid tow bar, the tow bar being permanently connected to the forward vehicle, the swinging movement of the tow bar from the horizontal perpendicular position being strongly resisted in a resilient manner, the resilience being provided by a spring which also serves as a resilient take-up means when the rear vehicle is towed. The structure is also characterized by a universal connection between the rear end of the tow bar and a female coupling member on the rear vehicle, the connection of the tow bar to the rear vehicle being quick-detachable, said connection comprising swinging spring-pressed holding members that act independently of each other in holding a tow-bar ball in a partly spherical seat, although the holding members are releasable through actuation of a common actuating member, the holding members, when and as released, moving in a generally rearward direction to free the ball or sphere of the tow bar.

It is apparent that the rods associated with the respective swinging jaws serve as journals therefor, said rods and their associated jaws turning on the same axes, one of said rods having an arm portion which, after a certain amount of lost motion, engages and turns the other rod. In the normal positions of the jaws, shown in Fig. 3, the upper jaw depends from an upper pivot, said jaw being inclined downwardly and rearwardly behind and in close proximity to an associated funnel wall, and the lower jaw being in a corresponding relation to an associated inclined funnel wall, forward swinging movement of the jaws being limited by their engagement with the funnel walls at edge portions of the funnel walls, which in the operative position of the device are comparatively close to the ball. By this arrangement the rear ball is very effectively secured and held when the tow bar is under tension. On the other hand, joggling or inching cannot be effective to disengage the ball from the jaw means.

While only one form of the device is shown in the drawings, it is understood that various modifications and changes in the organization of parts and in the details may be made without departing from the principles of the invention or the scope of the claims.

What I claim is:

1. In a coupling device in which the leading vehicle carries a swingable rearwardly projecting tow bar, said tow bar carrying a ball at its rear end, a coupling member carried by the following vehicle comprising a funnel adapted to receive and guide said ball to a substantially central holding means and also comprising a substantially central self-closing holding means which holds the ball securely in the towing position but is quickly releasable, said central holding means including swinging spring-pressed jaws having swinging axes located rearwardly of the funnel walls and at the forward parts of the jaws and also including journal rods constituting the swinging axes of the jaws, said journal rods having projecting free end portions and two corresponding end portions bent toward each other for engagement of one with the other, said engaging rod having a manipulating arm connected to its bent portion for swinging said rod to effect the release of the jaws.

2. In a coupling device in which the leading vehicle carries a rearwardly projecting tow bar, said tow bar carrying a ball at its rear end, a coupling member carried by the following vehicle comprising a hollow body and a funnel projecting forwardly from the body and having an aperture leading into the body, said body being provided at the rear with a partly spherical seat for the ball, and spring-pressed jaws pivoted to the body behind the funnel walls forwardly of said seat and generally inclined rearwardly and inwardly, said jaws having their pivots adjacent their forward ends and being provided adjacent their rear ends with partly spherical surfaces adapted to engage the ball forwardly of its vertical central transverse plane, said jaws being swingable rearwardly to release the ball.

3. In a device such as described, a spring equipped tow bar which is laterally rigid, coupling members attachable to respective vehicles, means for detachably connecting one of said members to one end of said bar, and means for connecting one of said members universally to the other end of said bar, said last-named means comprising a cam device acted on by the tow bar spring normally holding said bar in position at a predetermined angle to said second coupling member although permitting movement out of said position under a predetermined lateral pressure, said cam device comprising parts located respectively on the second-mentioned coupling member and on the tow bar, said spring also acting to cushion the coupling device under draft conditions.

4. In a device such as described, a tow bar comprising an elongated round shell, a piston enclosed by and longitudinally movable within the shell, and a spring confined between the shell and piston, said piston having an exteriorly projecting rod carrying a ball, a coupler body having a socket in which said ball is engaged and also having a cam face around the socket, and a member carried by the shell engaging said cam face under the action of said spring to hold the tow bar normally in a perpendicular position with reference to said body.

5. In a device such as described, a tow bar comprising an elongated round shell, a piston enclosed by and longitudinally movable within the shell, and a spring confined between the shell and piston, said piston having an exteriorly projecting rod carrying a ball, a coupler body having a socket in which said ball is engaged and also having a cam face around the socket, and a member carried by the shell engaging said cam face under the action of said spring to hold the tow bar normally in a perpendicular position with reference to said body, said body having a side recess communicating with the ball socket into which recess the bar can be swung for placing it in an inoperative position.

6. In a coupling device in which the leading vehicle carries a rearwardly projecting tow bar provided at its rear end with a ball, a coupling member carried by the following vehicle comprising a hollow body and forwardly of said body a rectangular funnel communicating therewith, said funnel having valleys leading from the corners to an approximately central point, which valleys have curved surfaces substantially conforming to the curvature of said ball, said body being provided interiorly rearwardly of the funnel with a partly spherical seat adapted to receive a rear face portion of said ball, spring-pressed jaw members in pivotal relation to said body rearwardly of the funnel walls having substantially diametrical relation to each other and inclined rearwardly and inwardly from their pivots and having at their inner ends partly spherical ball-engaging surfaces adapted to engage the ball surfaces only in locations forwardly of the central plane of the ball when seated in said seat for holding the ball in said seat, stops arranged forwardly of the jaws toward which the jaws are resiliently pressed, and manually operable means whereby said jaws may have their ball-engaging ends swung rearwardly for releasing the ball.

7. In a coupling device in which the leading vehicle carries a swingable rearwardly projecting tow bar carrying a ball at its rear end, a coupling member carried by the following vehicle comprising a forwardly facing funnel having a bottom aperture through which said ball can pass and having rearwardly of said aperture a spherical seat for the rear portion of the ball, said coupling member also having forwardly of said seat and rearwardly of the funnel spring-pressed jaws arranged to catch the ball and hold it securely in said seat, said jaws having positions in which they are inclined rearwardly and inwardly toward the ball and having pivots adjacent their forward ends and being cut away at their rear ends to conform to the ball surface in regions forwardly of the ball center, and stops arranged forwardly of the jaws toward which the jaws are resiliently pressed, the rearward jaw ends being contacted and thrust rearwardly to receive the impinging ball, and said jaws having releasing means associated therewith by means of which their ball-engaging ends can be swung rearwardly to free the ball.

8. In a coupling device in which the leading vehicle carries a swingable rearwardly projecting tow bar, said bar carrying a ball at its rear end, a coupling member carried by the following vehicle comprising a funnel adapted to receive and guide said ball to a substantially central holding means behind the funnel, said holding means comprising a rearwardly disposed seat for said ball and forwardly thereof generally rearwardly and inwardly inclined spring-pressed jaws pivoted at their forward ends relatively to the funnel, forward stops toward which the jaws are urged by their springs, the rear ends of said jaws being moved rearwardly against spring pressure to receive the impinging ball and the jaws being curved to conform to the ball surface forwardly of the ball center, said bar when under draft tending to pull the jaws forwardly and thereby tighten them on the ball, said jaws having releasing means associated therewith.

9. In a device such as described, the combination of a coupling body carried by a leading road vehicle and having a ball socket therein leading to a rear face of said coupling body, said rear face being dished around the entrance to said ball socket, a laterally rigid towing bar having an end ball engaged in said socket and laterally swingable to a substantial extent with said ball acting as a pivot, and means including a flange carried by said bar adjacent said ball and pressed resiliently against said dished face acting to hold said bar substantially horizontal and perpendicular with reference to said coupling body except when said bar is subjected to a relatively heavy lateral thrust, said bar being unencumbered substantially throughout its length and carrying at its rear end a coupling element adapted to be attached to a following road vehicle, the resistance of said bar to lateral thrust tending to swing it on said pivot being utilized to maintain the following vehicle in proper lateral relationship to the leading vehicle when the vehicles are on a curve.

10. In a coupling device in which the leading vehicle carries a rearwardly projecting tow bar, said tow bar carrying a ball at its rear end, a coupling member carried by the following vehicle comprising a hollow body and a funnel extending forwardly from the body and also comprising a self-coupling means including forwardly slanted and diverging spring-pressed jaws disposed rearwardly of said funnel and having forward pivoted ends mounted on a part rigid with the funnel and resiliently pressed against stops forwardly of the jaws to effect a holding action on said ball and adapted to have their rear ends swung rearwardly to receive the impinging ball, said jaws having releasing means associated therewith.

ARTHUR CLAUD-MANTLE.

REFERENCES CITED

The following references are of record in the file of this patent:

UNITED STATES PATENTS

| Number | Name | Date |
|---|---|---|
| 1,325,162 | McGriff | Dec. 16, 1919 |
| 1,412,834 | Bleoo | Apr. 18, 1922 |
| 1,527,149 | Holland | Feb. 17, 1925 |
| 1,654,939 | Loebs | Jan. 3, 1928 |
| 2,151,181 | Appell | Mar. 21, 1939 |
| 2,230,242 | Goodrich | Feb. 4, 1941 |
| 2,347,033 | Daton | Apr. 18, 1944 |
| 2,440,877 | Russell | May 4, 1948 |
| 2,441,285 | Pfeiffer | May 11, 1948 |